Figure 1:
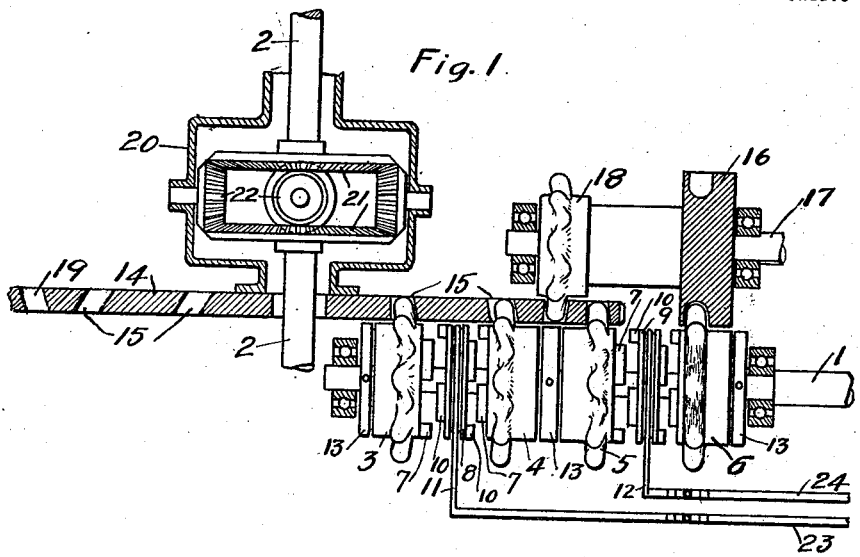

C. C. FORMAGE.
SPEED CHANGING MECHANISM.
APPLICATION FILED SEPT. 3, 1914.

1,188,641.

Patented June 27, 1916.
2 SHEETS—SHEET 1.

Witnesses:
Harry Bowen
Leo Turk

C. C. Formage, Inventor
By his Attorney J. O. Fowler.

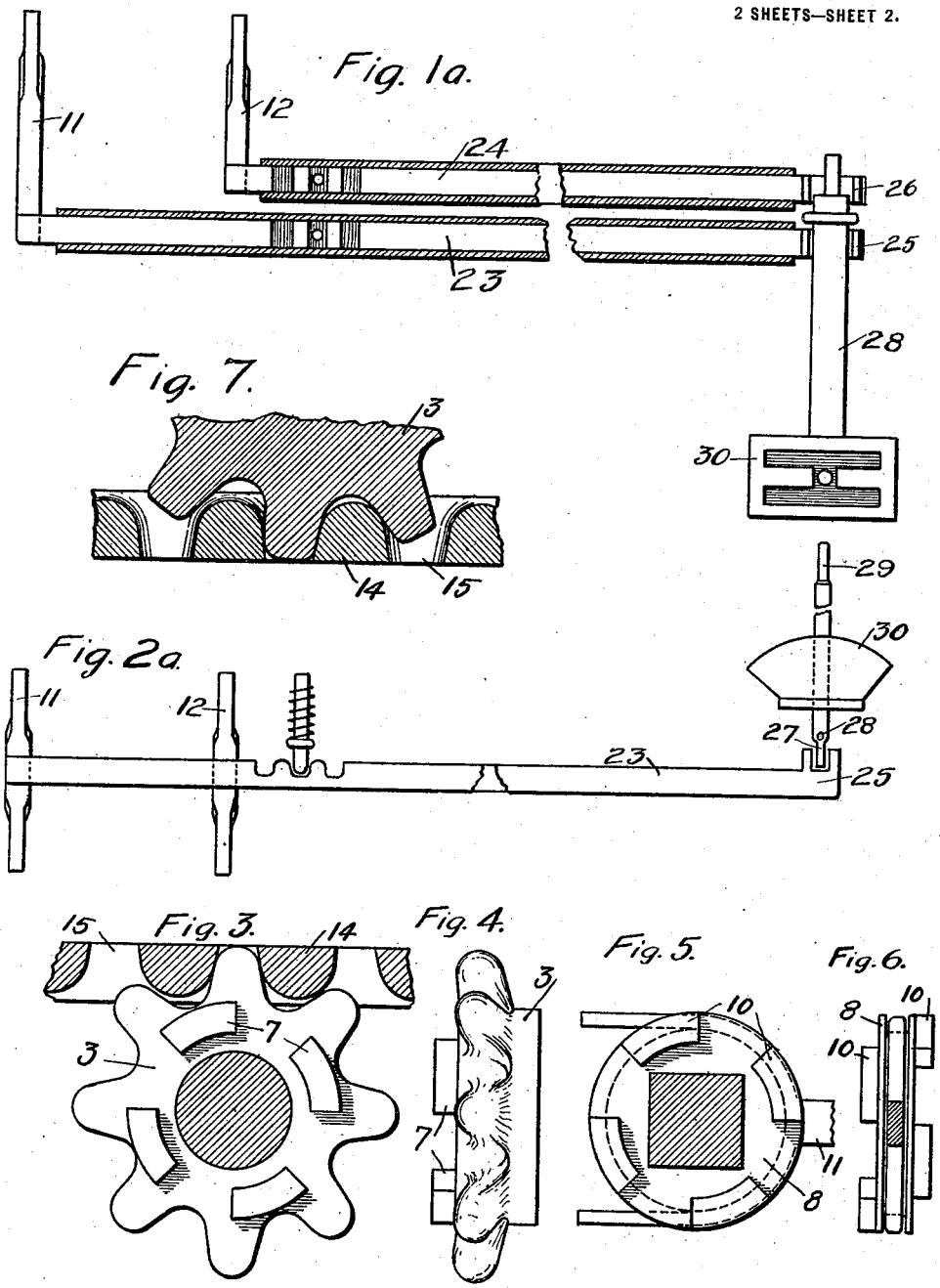

UNITED STATES PATENT OFFICE.

CHARLES C. FORMAGE, OF NEW ROCHELLE, NEW YORK.

SPEED-CHANGING MECHANISM.

1,188,641.              Specification of Letters Patent.     Patented June 27, 1916.

Application filed September 3, 1914. Serial No. 860,078.

*To all whom it may concern:*

Be it known that I, CHARLES C. FORMAGE, a citizen of France, and a resident of New Rochelle, in the county of Westchester and State of New York, have invented a certain new and useful Speed-Changing Mechanism, of which the following is a specification, the same being a full, clear, and exact description of the invention, such as will enable others skilled in the art to which it appertains to make and use the same.

This invention relates to transmission apparatus, and particularly to a variable speed-changing mechanism adapted, primarily, for employment in automobiles, although it may be utilized for other purposes, as where it may be advantageously used to vary the speed or relative movement of the parts, or it may be employed in any desired place where power is to be transmitted or controlled in a similar way.

The object of the invention is to produce a variable-speed mechanism of the character described which is simple, economical and also durable in construction, the various parts being substantial or massive as well as intrinsically strong and not liable to get out of order, the said device being also reliable and practically noiseless in operation. The desired object is attained by the novel devices, and the novel combination, arrangement and operation of devices as hereinafter set forth.

In the drawings, which illustrate the mechanism I prefer to use in connection with automobiles, the frame work of the vehicle, the box to inclose the driving-mechanism, the shaft bearings and other unessential parts, namely those that are not patentable, are omitted in order to give a clearer view of the devices in which my invention particularly resides.

In order to enable the invention to be fully understood, I shall proceed to explain the same by reference to the said drawings, illustrative of one embodiment of my invention, which accompany and form a part of this specification, and in which—

Figure 2:
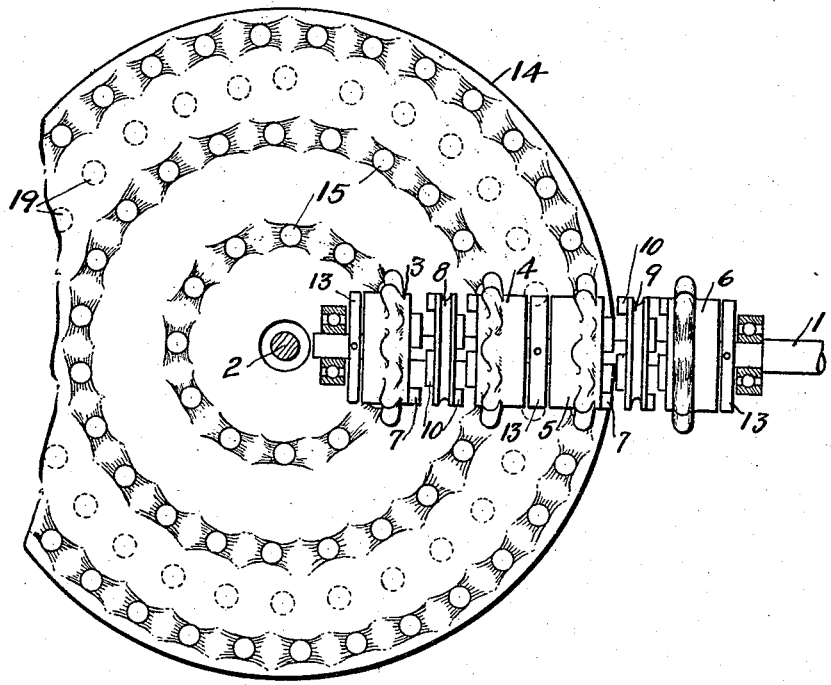

Figures 1 and 1ª are plan views and Figs. 2 and 2ª side elevations of a structure in which my invention is embodied; and Figs. 3, 4, 5, 6 and 7 are views in detail of various parts of the speed-changing mechanism.

Like reference characters indicate like parts in all the views.

The drawings illustrate the mechanism I prefer to use for transmitting power from a driving shaft, as 1, to driven shafts, as 2, and for enabling the speed of the driven shafts to be varied with reference to that of the driving shaft. Mounted on the shaft 1, but movable independently of the same, are a plurality of series of members of my driving-mechanism comprising preferably alined wheels, in the present instance four, as 3, 4, 5 and 6, being shown, the peripheries of which wheels are preferably convoluted or made in wave form, thus presenting alternate projecting or elevated and recessed portions, the said edges being preferably curved both in transverse and in longitudinal sections, the perimeters and adjacent portions of the wheels, 3, 4, 5 and 6 being also preferably arranged in concave conformation so that they will turn away from the plane of the transverse axis of the shaft 1 at an angle to the same. It will be observed that the teeth of the said speed changing gears or wheels not only taper in curvilinear fashion toward their heads or outer extremities, but are inclined forwardly or curved up in bowl conformation; and also that the orifices formed in the speed changing disk or transmission plate are of beveled or bell shape form, the tapering and enlarged or widened ends of which are arranged in circular conformation, so that the teeth of the gears can enter and leave the said orifices without clash or friction, inasmuch as there is a direct and continuous connection between the driving speed changing wheels or gears and the speed changing disk or transmission plate (the teeth of the former entering the orifices gradually a greater or less degree with a relatively forward action in a practically axial direction) which structure prevents a rolling movement without any sliding of the parts. The teeth of the gears are inclined according to the circumference of the series of orifices with which they engage, and the orifices are countersunk according to the inclination and pitch of the teeth of the gears. This structure is particularly efficacious in effecting the quick changing of the speed without noise or jar which ordinarily frequently occurs, especially after the parts have become somewhat worn in use, which objections are particularly noticeable in cases where bevel gears are employed. The above mentioned avoidance of jar or shock is due to the gradually increasing engagement of the parts, in lieu of the employment of opposing teeth which are caused to meet or strike all at once throughout their entire extent. By the employment of a spur pinion having laterally inclined radially projecting teeth and a disk provided with lateral circumferential toothed recesses, a more prolonged tooth engagement is effected.

The opposing faces of the pair of wheels 5, 6, and those of the pair of wheels 3, 4, are preferably formed with clutch engaging members 7 constructed and arranged to coact with and engage at will with the clutch engaging members 10 of clutch members, as 8, 9, which clutches are preferably adapted to be movable upon, but to rotate with, the shaft 1, and they are preferably constructed and arranged to be moved relatively to each other in an axial direction for engagement and disengagement with the various wheels. The clutch member 8 is preferably constructed and arranged to be moved back and forth, so as to be locked to either of the wheels 3 or 4 at will, by means of the manually actuated fork 11, and the clutch 9 is preferably adapted to work laterally along the shaft 1 by means of pressure upon a fork, as 12, which forks are preferably constructed and arranged to be moved or adjusted by arms 23, 24, actuated by the operator in the ordinary or any suitable manner in order that the clutch 8 may be either held in a neutral or inoperative position or to be engaged with the clutch members of either of the wheels 3 or 4 at will, and so that the clutch 9 may serve to operatively engage either of the wheels 5 or 6. Spacing devices, as 13, are preferably secured to the shaft 1 in order to serve to assist to hold the said wheels from lateral movement and to maintain them in the proper operative position.

I preferably employ, as another member of my driving-mechanism, a disk or plate, as 14, connected through the differential device with the driven shafts 2 and constructed and arranged to move concurrently with the same. This disk is preferably positioned, as represented in Figs. 1 and 2, so that its right hand face shall lie at the left of the wheels 4, 5, 6, and is preferably provided with a plurality of concentric series of recessed portions 15, the central parts of which are ordinarily curved or made in circular conformation, the longitudinal opposing edges or walls of the recesses being preferably, as it were, laterally countersunk or made in practically oval form. Three of such rows are shown in the present instance. The said recesses, which are preferably of practically segmental form, and the walls of which are preferably circular in transverse section, may vary in number in each row. For example, the recesses of the inner row may be fewer, and those of the outer series greater, in number than those of the central row, but each recess of each series is preferably located an equal distance from its adjacent one on each side thereof in all of the said rows of recesses. The disk 14 thus has a series of, and preferably three, rows of recesses, thereby constituting, as it were, three concentric tracks or ways having alternate recessed and elevated portions, the same thus forming a sort of crown or face wheel.

The recesses 15 of all of the three series thereof are preferably respectively constructed and positioned so as to register with, and to be loosely fitted to, the elevated portions of the wheels 4, 5, 3, in such a manner that at least one of said projecting parts of each of said wheels shall always lie within one of the recessed portions of the series of recesses with which it is registered. The disk 14 will thus be rotated at a different rate of speed according to whether it is operatively impelled by a wheel 4, or by a wheel 5, or by a wheel 3, in either of which cases the remaining two wheels will be idle, inasmuch as although they will rotate with the disk 14, yet not being engaged with, and locked to, a clutch they will turn loosely on the shaft 1.

The casing 20 of the differential device is preferably rigidly secured to the disk 14, which casing also serves to support in a rigid relation the spindles of the preferably four bevel wheels 22 which are respectively engaged with the bevel wheels 21, the latter being respectively mounted on the driven shafts 2 preferably forming the axles of the wheels of the vehicle. The spur wheel 6 is preferably in continuous engagement with a recessed wheel or intermediate reversing gear 36 which in turn meshes with a suitably formed wheel 16 which is preferably rigidly mounted on a supplemental or counter shaft 17 which latter is preferably positioned in a plane different from and parallel with, that of the driving shaft 1, which shaft 16 also carries fixed to the same a wheel 18 preferably made like the wheels 3, 4 and 5, which wheel 18 preferably engages with a row of recesses 19 of the disk 14 located on the left hand face thereof, as represented in Figs. 1 and 2, and made similar to those already described, the latter series of recesses, however, although preferably concentric with the formerly named ones, being preferably positioned between two of the rows of recesses on the opposite face of the disk, and arranged in a staggered formation in relation to the same. These last named parts are preferably used to reverse the movement of the driven shafts upon the clutch 9 of the fork 12 being engaged with the wheel 6. The shafts 1 and 17 are preferably radially disposed.

In Figs. 1ᵃ and 2ᵃ one form of manually actuated means for operating the clutch controlling forks 11 and 12 is shown diagrammatically. The arms 23 and 24 terminate respectively in yokes 25 and 26 which yokes may be respectively engaged by the depending arm 27 of the manual shift lever 29 which is mounted on the preferably tubular bearing 28 in order that the said hand lever may be moved laterally to either one of two positions to register with the yoke 25 or the yoke 26, and then thrust either forward or rearward in the guide 30 for the said shift lever in order to operate either the clutch 8 or the clutch 9 as may be desired. The engagement of each driving member with the driven member is positive and continuous, and the operative engagement of either of the driving wheels with the driven member is quickly and positively made by the manipulation of the means controlling the movement or operation of the clutch controlling forks.

It is obvious that the mechanism described may be combined with all kinds of transmission used in vehicles, such as belts, chains, etc., or just as well connected to the axis of the motor directly in a similar manner to that in which devices of this character are ordinarily employed. The mechanism is extremely simple, comprising but few parts, and few operations are necessary to secure the various speeds specified, and, on account of the continuous engagement of the driving and driven members, it operates with but little or no noise.

It is to be noted that the recesses in the disk preferably, although not necessarily, extend entirely through the same, and are also preferably wide enough at the mouth thereof for the wheel projections to have a somewhat relative radial movement in the said flaring recesses, the bent end of each wheel projection first entering the approaching recess and when in full engagement, the bottom or foot of the projection lying in the center of said recess, and the rounded space between two recesses preferably extending to a short distance from the face of the disk.

I wish it to be understood that I do not desire to be limited to the exact details of construction shown and described, for obvious modifications confined to the scope of the claims will occur to a person skilled in the art.

What I claim as my invention is:—

1. In a transmission mechanism, an element provided with circumferential toothed recesses and a spur gear engaging therewith having laterally inclined radially projecting teeth whereby a more prolonged tooth engagement is effected.

2. An article of manufacture comprising a spur pinion, adapted to enmesh with an element provided with a series of lateral circumferential tooth recesses, said pinion having laterally inclined radially projecting teeth.

In testimony of the foregoing specification I do hereby sign the same in the city of New York, county and State of New York, this 22nd day of August, 1914.

CHARLES C. FORMAGE.

Witnesses:
CARL V. BERTSCHE,
J. ODELL FOWLER.

Copies of this patent may be obtained for five cents each, by addressing the "Commissioner of Patents. Washington, D. C."